United States Patent
Naito et al.

(10) Patent No.: US 8,907,232 B2
(45) Date of Patent: Dec. 9, 2014

(54) COMPONENT FORCE DAMPING DEVICE AND PLATFORM SCALE USING SAME

(75) Inventors: Kazufumi Naito, Tokyo (JP); Hiroshi Suzawa, Tokyo (JP)

(73) Assignee: Shinko Denshi Co., Ltd., Tokyo (JP)

( * ) Notice: Subject to any disclaimer, the term of this patent is extended or adjusted under 35 U.S.C. 154(b) by 259 days.

(21) Appl. No.: 13/376,324

(22) PCT Filed: Jun. 23, 2010

(86) PCT No.: PCT/JP2010/060669
§ 371 (c)(1),
(2), (4) Date: Dec. 16, 2011

(87) PCT Pub. No.: WO2011/001877
PCT Pub. Date: Jan. 6, 2011

(65) Prior Publication Data
US 2012/0085586 A1    Apr. 12, 2012

(30) Foreign Application Priority Data

Jun. 30, 2009  (JP) ................................. 2009-155214

(51) Int. Cl.
| | |
|---|---|
| G01G 23/26 | (2006.01) |
| G01G 3/16 | (2006.01) |
| G01G 21/23 | (2006.01) |
| G01G 21/06 | (2006.01) |
| G01G 21/18 | (2006.01) |
| G01G 21/24 | (2006.01) |

(52) U.S. Cl.
CPC .................. *G01G 3/16* (2013.01); *G01G 21/23* (2013.01); *G01G 21/06* (2013.01); *G01G 21/184* (2013.01); *G01G 21/242* (2013.01)
USPC ....................................................... 177/187

(58) Field of Classification Search
CPC ..... G01G 21/06; G01G 21/23; G01G 21/184; G01G 21/242
USPC ........................... 177/132–144, 184, 185, 187
See application file for complete search history.

(56) References Cited

U.S. PATENT DOCUMENTS 3,980,148 A     9/1976 Von Drygalski
4,064,955 A  *  12/1977 Dyck ............................ 177/134
(Continued)

FOREIGN PATENT DOCUMENTS

| JP | 51-002455 A | 1/1976 | |
|---|---|---|---|
| JP | 57-068529 U | 4/1982 | |
| JP | 57082720 A * | 5/1982 | ............. G01G 19/02 |

(Continued)

OTHER PUBLICATIONS

International Search Report of PCT/JP2010/060669, mailing date Jul. 20, 2010.

*Primary Examiner* — Randy W Gibson
*Assistant Examiner* — Natalie Huls
(74) *Attorney, Agent, or Firm* — Westerman, Hattori, Daniels & Adrian, LLP (57) ABSTRACT

A platform scale is provided including a plurality of component force damping devices. The platform scale for weighing an object by supporting a support member that supports the object by a plurality of load detection units includes at least four component force damping devices, each comprising a plurality of needle bearings disposed in parallel and a pair of opposed plates for sandwiching the the needle bearings, so that the pair of plates make a relative movement in a direction of the arrangement of the needle bearings. The four component force damping devices are in contact with the support member at four locations that form a rectangle. Directions of the relative movement of any two component force damping devices located at the same side of the rectangle are different, while directions of the relative movement of any two component force damping devices at diagonal locations of the rectangle are identical.

7 Claims, 11 Drawing Sheets

(56) References Cited

U.S. PATENT DOCUMENTS

| | | | | |
|---|---|---|---|---|
| 4,411,327 A | * | 10/1983 | Lockery et al. | 177/211 |
| 4,506,746 A | * | 3/1985 | Lockery | 177/211 |
| 5,600,104 A | * | 2/1997 | McCauley et al. | 177/136 |
| 5,894,112 A | * | 4/1999 | Kroll | 177/134 |
| 6,177,638 B1 | * | 1/2001 | Murray | 177/133 |

FOREIGN PATENT DOCUMENTS

| | | | | |
|---|---|---|---|---|
| JP | 58-019235 U | | 2/1983 | |
| JP | 7-280635 A | | 10/1995 | |
| JP | 2000088635 A | * | 3/2000 | G01G 23/01 |
| JP | 2002-131148 A | | 5/2002 | |
| JP | 2010-066016 A | | 3/2010 | |

\* cited by examiner

COMPONENT FORCE DAMPING DEVICE AND PLATFORM SCALE USING SAME

FIELD OF INVENTION

The present invention relates to a component force damping device for preventing measurement precision from degrading due to bend of a support for object to be weighed and a platform scale using same, more specifically to achievement of high precision weighing.

BACKGROUND ART

Electronic scales can be classified primarily into a load cell type using a strain gauge, a tuning fork vibration type using a tuning fork vibrator and an electromagnetic balancing type using an electromagnet and an electromagnetic coil.

The load cell type makes weight measurements based on the amount of transformation of a strain gauge by a load. As disclosed in a Patent Document 1 hereinafter, the tuning fork vibrator type makes weight measurements by using the fact that the vibration frequency of a tuning fork vibrator is proportional to a load applied between both ends of the tuning fork. On the other hand, the electromagnetic balancing type breaks the balanced condition of a mechanical balance mechanism by a load and recovers the balanced condition by flowing electrical current through the electromagnetic coil, thereby determining the weight of the load based on the amplitude of the electrical current.

As far as precision of these scales is concerned, the tuning fork vibrator type and the electromagnetic balancing type are higher than the load cell type. On the other hand, in the manufacturing cost of these scales, the electromagnetic balancing type is the highest because of its complex construction and the load cell type is the lowest because of its simplest construction.

Currently, most of platform scales having a weighing range (measurement range) up to 300 kg are the load cell type.

However, there are increasing needs in production fields for measuring weight of objects to be weighed in high precision for cases such as, for example, weighing raw bath contained in a drum. This is the reason why it is necessary to improve measurement precision of platform scales.

Precision improvement of a platform scale cannot be achieved by simply employing a higher precision weighing type. It is also necessary to assure mechanical strength to tolerate a heavy object. There is a need for providing a construction capable of stably weighing heavy objects.

Particularly, in case of weighing a heavy object, there arises a problem of bending a support member for supporting the object to be weighed due to the weight thereof.

Figure 10:
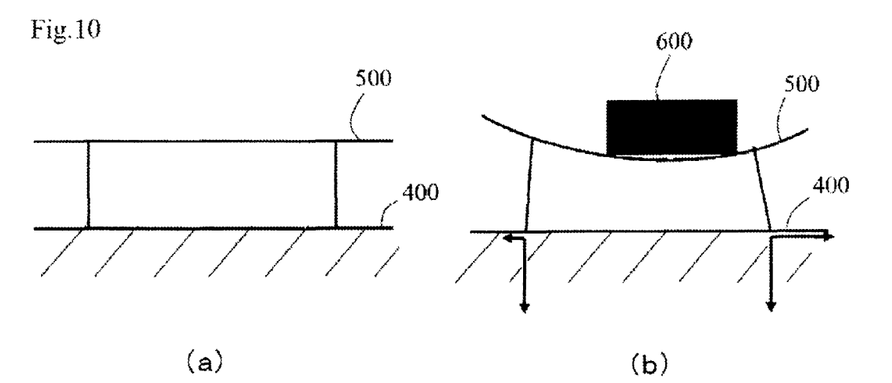
FIG. 10 is an illustration to explain a component force in the horizontal direction due to bending of a weighing dish.

As shown in FIG. 10 (a), in case of placing a heavy object 600 on a flat weighing dish 500, it may bend as shown in FIG. 10 (b). As a result, stress may develop in the horizontal direction with respect to the load detection section 400 that supports the weighing dish 500. Such force in the horizontal direction causes an error in the load detection section 400 that detects the load in the vertical direction, thereby degrading detection precision.

Figure 11:
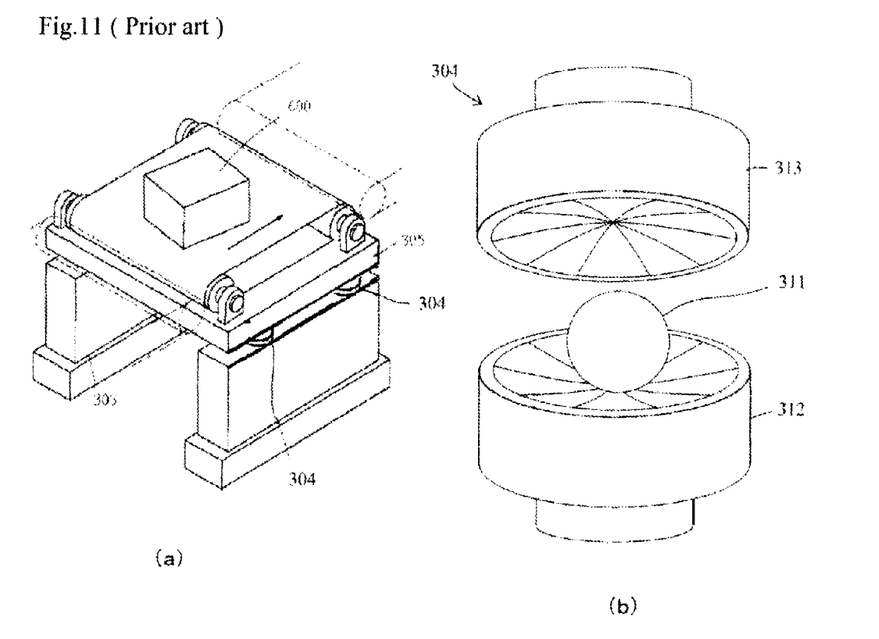
FIG. 11 illustrates a weighing conveyor (a) using a conventional component force damping device (b).

As shown in FIG. 11, in order to reduce such error, any conventional weighing machines for weighing heavy objects interpose a component force damping device 304 (see FIG. 11 (b)) between a support member 305 that supports an object to be weighed and a load detection section 303 by sandwiching a ball 311 with a pair of bearing plates 312 and 313 (see FIG. 11 (a)).

In this particular configuration, any horizontal stress due to bend of the support member 305 is released by the component force damping device 304, thereby keeping the load detection section 303 unaffected.

PRIOR ART DOCUMENT:

Patent Document:

Patent Document 1: JP2002-131148 A

SUMMARY OF INVENTION

Problem to be Solved by the Invention

Unfortunately, however, although platform scales are required to reduce the height of a weighing table for ease of loading and unloading a heavy object on the weighing table, the component force damping device employing the ball as shown in FIG. 11 (b) has a large thickness of about 35 mm, thereby preventing the height of the weighing table from reducing.

In this particular configuration, if one may attempt to reduce the height by employing a smaller diameter ball, contact areas between the ball and the bearing plates 312 and 313 are localized and there is a higher risk of destroying the bearing plates due to excessive force applied to such bearing plates. This is the reason why it is difficult to further reduce the thickness.

In consideration of foregoing circumstances, the co-inventors of the present invention have proposed a thin type component force damping device for damping the component force in a given direction by disposing a plurality of needle bearings (see JP2010-066016 A).

The present invention is a further improvement of a platform scale employing such thin type component force damping device and a component force damping device thereof. It is therefore an object of the present invention to provide a platform scale to achieve high precision by incorporating a plurality of such thin type component force damping devices and also a thin type component force damping device that can be easily assembled into a weighing machine.

Means to Solve the Problem

The present invention is a platform scale for weighing an object to be weighed by supporting a support member for supporting such object to be weighed by a plurality of load detection units and comprises an arrangement of a plurality of needle bearings disposed in parallel with one another and a pair of opposed plates for sandwiching the arrangement of the needle bearings. It is characterized in that at least four of the component force damping devices capable of relative movement in the direction of the arrangement of the needle bearings between the pair of plates are disposed between the support member and the plurality of load detection units and that the four component force damping devices are in contact with the support member at four locations that form a rectangle. Directions of relative movement of a pair of the component force damping devices locating on the same side of the rectangle differ, while directions of relative movement of a pair of the component force damping devices on diagonal locations of the rectangle are the same.

The component force damping devices of the particular embodiment are able to release the horizontal component force due to the bending.

On the other hand, the platform scale according to the present invention supports the support member by a pair of parallel load detection units in which each of the load detection units comprises a pair of component force damping devices that are positioned on the same side of the rectangle.

Similarly, the platform scale according to the present invention supports the support member by four load detection units that are disposed in two rows, each row comprising two parallel units. And each of the load detection units includes the component force damping devices in such a manner to form the rectangle.

The present invention is also directed to a component force damping device that comprises an arrangement of a plurality of needle bearings disposed in parallel and a pair of opposed plates sandwiching the arrangement of the needle bearings in such a manner that the pair of plates are capable of making a relative movement in the direction of arrangement of the needle bearings. It is characterized in the provision of a spring member to return the pair of plates to the initial condition of the relative movement when no load is applied.

Although an additional operation to return the relatively movable plates to their initial position is required when assembling into a weighing apparatus in case of a component force damping device having no such spring member, the component force damping device provided with the spring member is able to automatically set the plates to their initial position.

The component force damping device provided with the spring member can be used for the aforementioned platform scale. It is needless to say that the aforementioned platform scale can use the component force damping device having no spring member.

Advantages of the Invention

The platform scale according to the present invention is unaffected in measurement results even if the support member for supporting an object to be weighed may be bent, thereby enabling high precision weighing.

Accordingly, it is possible to reduce rigidity standards of the support member and thus reduce the manufacturing cost of the platform scale.

Also, the component force damping device according to the present invention is able to make a significant improvement in manufacturing efficiency when assembling it into a weighing machine.

EMBODIMENTS TO IMPLEMENT THE INVENTION

Figure 1:
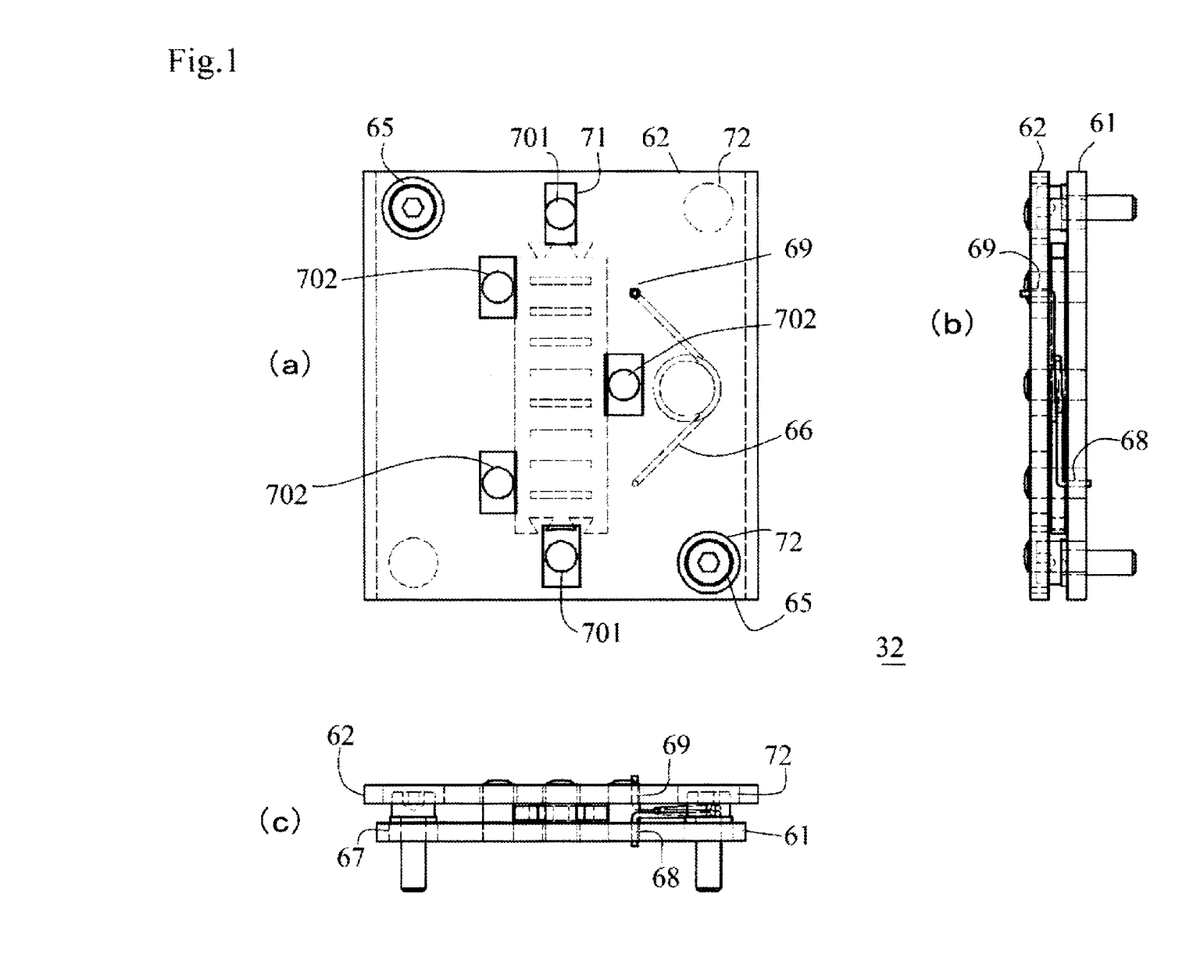
FIG. 1 shows an embodiment of a component force damping device according to the present invention, wherein (a) is a plan view, (b) and (c) are side views.
Figure 2:
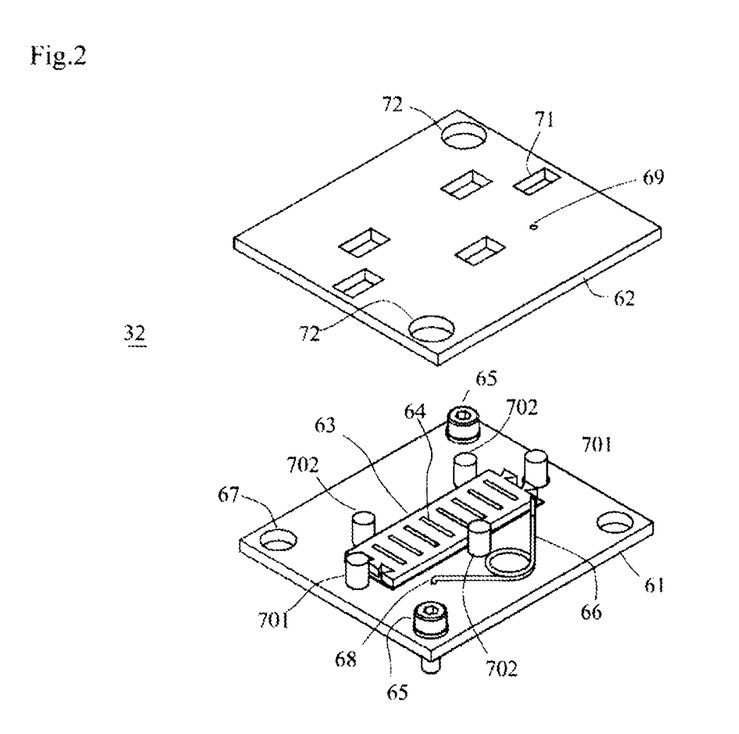
FIG. 2 is an exploded perspective view of the component force damping device as shown in FIG. 1.

FIGS. 1 and 2 show an embodiment of a component force damping device 32 according to the present invention. FIG. 1 (a) is a plan view and FIGS. 1 (b) 1(c) are side views, while FIG. 2 is an exploded perspective view.

The component force damping device 32 comprises a linear movement bearing 63 including a plurality of needle bearings 64 disposed in parallel, a first flat plate 61 for positioning the linear movement bearing 63, a second flat plate 62 for sandwiching the linear movement bearing 63 between itself and the first flat plate 61, a spring member 66 bridging between the first flat plate 61 and the second flat plate 62, and mounting screws 65 for mounting the component force damping device 32 onto a load detection unit and the like.

Moreover, the first flat plate 61 is provided with projections 702 adjacent to the longer sides of the linear movement bearing 63 for positioning thereof and projections 701 at opposite locations adjacent to the shorter sides of the linear movement bearing 63. The projections 701 at the locations opposed to the shorter sides of the linear movement bearing 63 are provided at locations to permit movement of the linear movement bearing 63 in a predetermined distance or range. The second flat plate 62 is provided with rectangular holes 71 to permit entrance of tops of the projections 701 and 702.

The spring member 66 is made of a wire having a center coil section and both arms extending from the center section to depart from each other at a wide angle. A free end of one of the arms is bent toward the first flat plate 61, while that of the other arm is bent toward the second flat plate 62. The first flat plate 61 is formed with a hole 68 to mate with one of the bent end of the spring member 66. On the other hand, the second flat pate 62 is formed with a hole 69 to mate with the other bent end.

The first flat plate 61 is also formed with mounting holes 67 for mating with a play with shaft sections of mounting screws 65. the second flat plate 62 is formed with holes 72 to mate with a play with head sections of the mounting screws 65.

When a force is applied in the horizontal direction to either the first flat plate 61 or the second flat plate 62 of the component force damping device 32 that is made by assembling the first flat plate 61, the linear movement bearing 63, the spring member 66, the mounting screws 65 and the second flat plate 62 in the manner as shown in FIG. 1, the first flat plate 61 and the second flat plate 62 are permitted to make a relative movement in the direction of arrangement of the needle bearings 64 of the linear movement bearing 63 against the spring force of the spring member 66. Such relative movement is permitted within a range that restricts the movement by hitting the projections 701 and 702 against the walls of the rectangular holes 71.

When the load to be applied to the first flat plate 61 and the second flat plate 62 is released, the spring force of the spring member 66 forces the first flat plate 61 and the second flat plate 62 to return to the condition where the projections 701 and 702 are in the center position of the respective rectangular holes 71, i.e., the initial position.

When the component force damping device 32 is being assembled into a platform scale, it automatically maintains the initial position, thereby eliminating additional operations for keeping the first flat plate 61 and the second flat plate 62 in the initial position and thus improving manufacturing efficiency.

Figure 5:
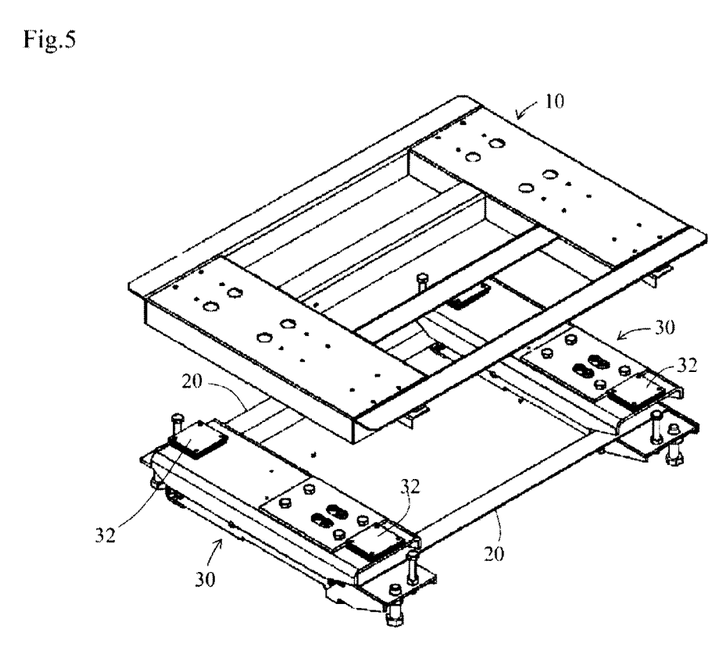
FIG. 5 is an exploded perspective view of an embodiment of a platform scale according to the present invention.

Now, FIG. 5 illustrates a platform scale into which the component force damping devices 32 or any component force damping devices having no spring member 66 are assembled.

Figure 6:
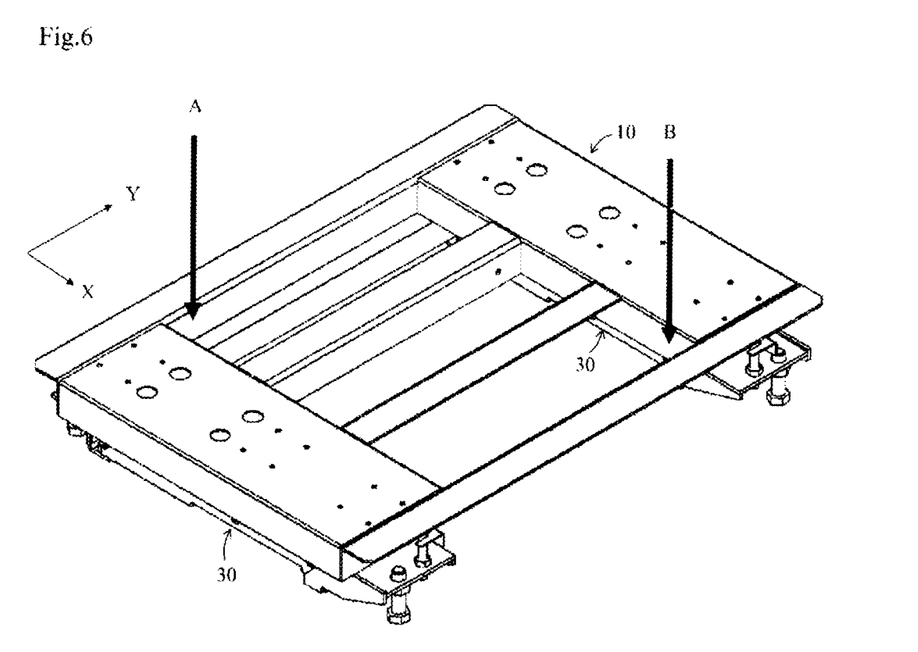
FIG. 6 is a perspective view of the platform scale as shown in FIG. 5.

The platform scale comprises an upper frame 10 for supporting a weighing dish (not shown), a pair of parallel base frames 20, 20 and load detection units 30 that bridge between the base frames 20, 20. FIG. 6 illustrates the assembled condition of these constituting elements.

Figure 7:
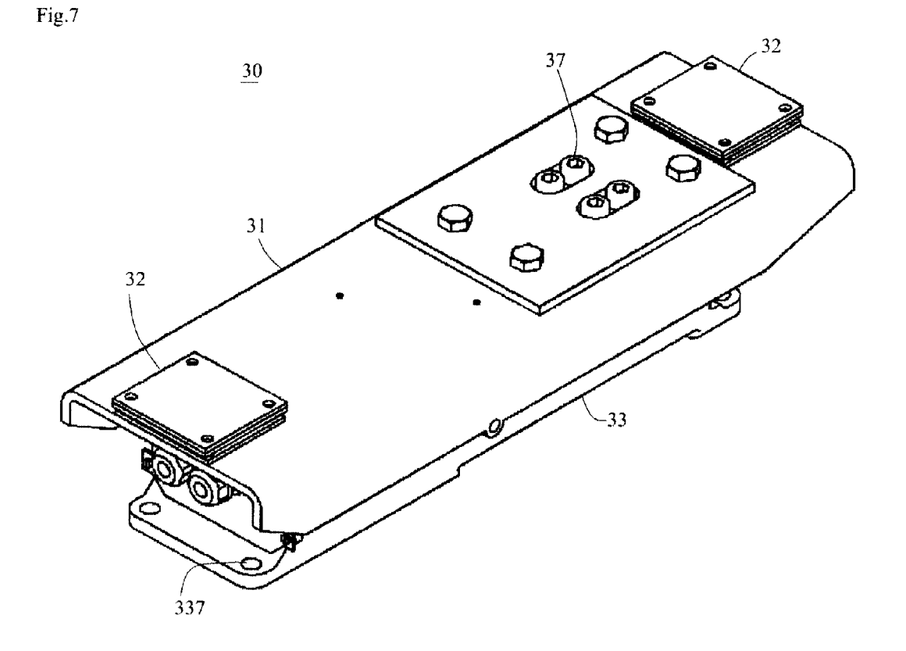
FIG. 7 is a perspective view of an embodiment of the load detection unit according to the present invention.
Figure 8:
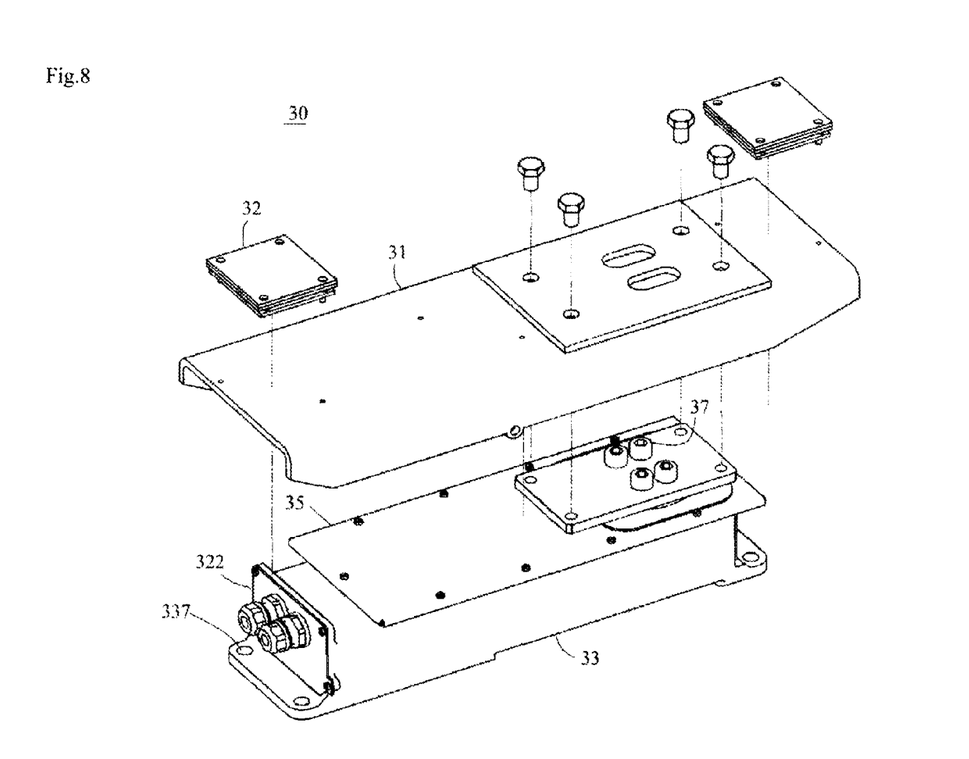
FIG. 8 is an exploded perspective view of the load detection unit as shown in FIG. 7.

FIG. 7 illustrates only one of the load detection units 30. FIG. 8 is a perspective view of the load detection unit 30. The load detection unit 30 includes an upper support member 31 for supporting the upper frame 10 and a sensor case 33 for accommodating a load sensor and a circuit board. The component force damping devices 32 are placed on the upper support member 31 that supports the upper frame 10.

The sensor case 33 is fabricated by die casting by first making a die by a lost wax process and then flowing molten stainless material into the die, thereby exhibiting high rigidity. Accordingly, the sensor case 33 is integrally formed with screw holes 337 for mounting on the base frames 20, thereby using it also as a structural material for maintaining the distance between the base frames 20, 20 as shown in FIG. 5.

Figure 9:
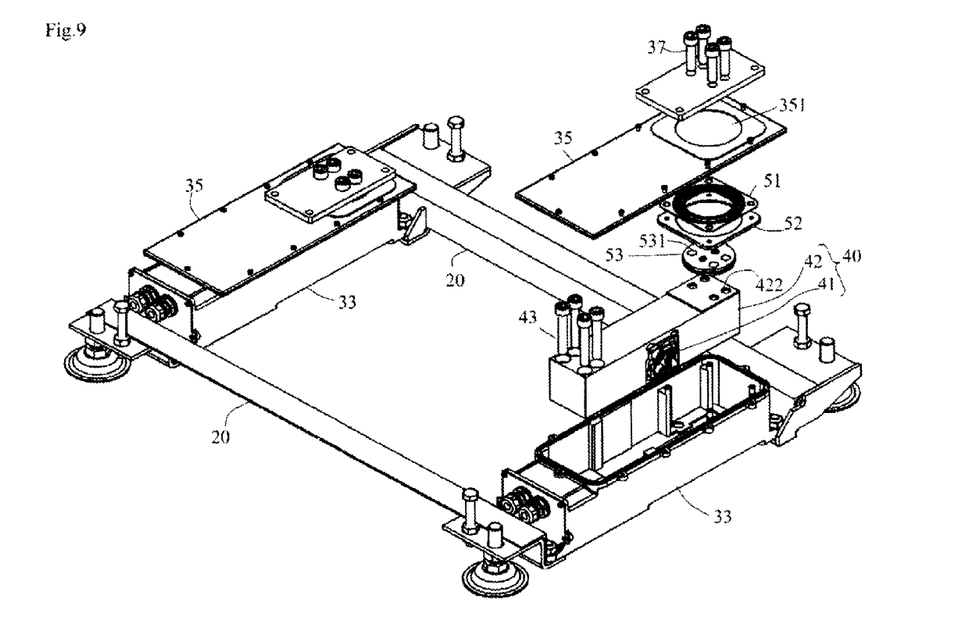
FIG. 9 is an exploded perspective view of a sensor case of the platform scale as shown in FIG. 5.

FIG. 9 is a perspective view of the sensor case 33 for illustrating internal components thereof.

The sensor case 33 accommodates the load detection sensor 40 comprising a force sensor 41 including a tuning fork vibrator and a block body 42 made of aluminum alloy. A fixed side of the block body 42 is fixedly mounted on the bottom of the sensor case 33 using bolts 43, while a movable side of the block body 42 is fixed to bolts 37 for transmitting the load.

An open end of the sensor case 33 that accommodates the load detection sensor 40 is closed with a cover 35 and gaps between the holes 351 and the bolts 37 to be inserted into the holes 351 in the cover 35 are sealed with a sealing mechanism comprising a diaphragm 51, a pair of clamping plates 53 for sandwiching the circular periphery of the diaphragm 51 and a mounting plate 52 for fixedly mounting the outer periphery of the diaphragm 51 on the rear face of the cover 35.

The clamping plates 53 are formed with holes 531 for tightly mating with the bolts 37. Front ends of the bolts 37 extending through the holes 531 are mated with screw holes 422 at the movable side of the block body 42.

As a result, in the platform scale, a load to be applied to the upper frame 10 is transmitted to the upper support members 31 of the pair of load detection units 30 that are in contact with the upper frame 10. The load is then transmitted from the upper support member 31 to the bolts 37 that support the upper support member 31. Then, the movable side of the block body 42 of the load detection sensor 40 transforms by the load applied to the bolts 37. A signal responsive to such transformation is outputted from the tuning fork vibrator in the force sensor 41. The signal is, then, converted into a digital signal by a circuit on the circuit board that is accommodated in the sensor case 33. The digital signals outputted from the pair of load detection units 30 are added to each other for indicating the weight of an object to be weighed on a display (not shown).

Figure 3:
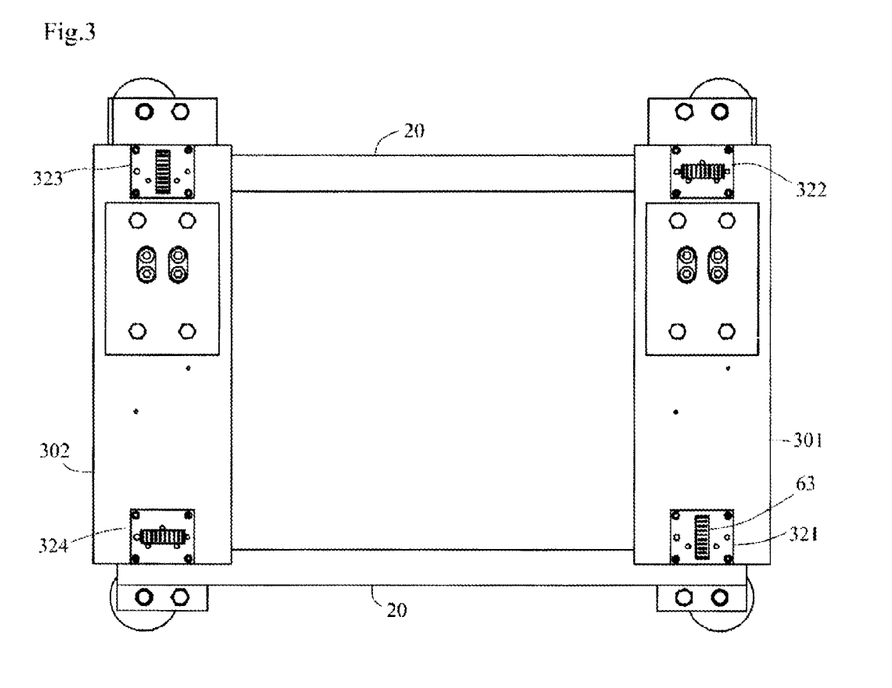
FIG. 3 is a plan view of a platform scale employing a pair of load detection units according to an embodiment of the present invention.

FIG. 3 shows the direction of the linear movement bearings 63 of the component force damping devices 321, 322, 323 and 324 disposed on the upper support member of the pair of load detection units 301 and 302, i.e., in such a manner to clearly show the direction of relative movement of the first flat plate 61 and the second flat plate 62 constituting each component force damping device.

The direction of relative movement of the component force damping device 321 is the same as that of the component force damping device 323 locating at the diagonal locations but in perpendicular to that of the component force damping device 322 locating at the same load detection unit 301. Also, it is in perpendicular to the direction of relative movement of the component force damping device 324 locating at the same side as another load detection unit 302.

In other words, in consideration of a rectangle made by connecting the component force damping devices 321, 322, 323 and 324, the directions of relative movement of the pair of component force damping devices locating at the same side of the rectangle are in perpendicular to each other, while the directions of relative movement of the pair of component force damping devices locating at the diagonal positions of the rectangle are identical to each other.

Such relationship is applicable to all of the component force damping devices 321, 322, 323 and 324.

Such relationship can be interpreted as follows. That is, the direction of relative movement of the component force damping device 321 is changed by 90 degrees by the component force damping device 322, changed again by 90 degrees by the component force damping device 323 and then further changed by 90 degrees by the component force damping device 324 so as to return to the component force damping device 321 after making one complete cycle.

By locating the component force damping devices on the upper support member of the load detection unit in the above manner, even if the upper frame 10 may be bent in any direction, it is possible to release any horizontal component force due to such bending.

For example, in FIG. 6, if any bending in the X-direction at a location adjacent to the position A may be developed by an object to be weighed due to biased positioning thereof, it is primarily the component force damping device 323 that releases the horizontal component force. On the other hand, if bending in the Y-direction is developed at a location adjacent to the position A, the resulting horizontal component force due to bending is released jointly by the component force damping device 322 and the component force damping device 322. In case of bending in the Y-direction at a location adjacent to the position B, the resulting horizontal component force due to bending is released jointly by the component force damping device 322 and the component force damping device 324.

Figure 4:
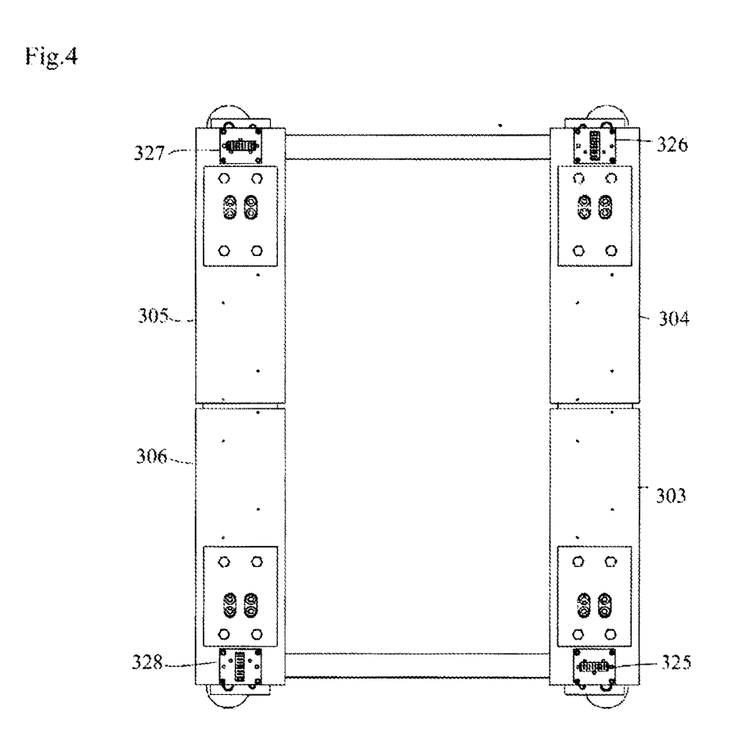
FIG. 4 is a plan view of a platform scale employing four load detection units according to an embodiment of the present invention.

Now, FIG. 4 illustrates an instance where the load detection units are arranged in two rows, each including two units. The component force damping devices 325, 326, 327 and 328 are disposed respectively for the four load detection units 303, 304, 305 and 306 for supporting the upper frame 10.

In this particular embodiment, the directions of relative movement of two component force damping devices at the same side of the rectangle made by connecting the component force damping devices 325, 326, 327 and 328 are perpendicular to each other, while the directions of relative movement of the two component force damping devices at the diagonal positions of the rectangle are identical to each other similar to the instance of FIG. 3. Accordingly, even if the upper frame 10 may be bent in any direction, it is possible to release the horizontal component force due to such bending.

The amount of bending of the frame becomes very large in case of weighing a very heavy object that a pair of load detection units cannot support. The configuration as shown in FIG. 4 is effective in such instance.

It is preferable in this platform scale to employ the component force damping devices as shown in FIGS. 1 and 2. However, it is of course possible to employ thin component force damping devices excluding the automatic recovery mechanism.

Also, this particular platform scale can be applied to any types other than the tuning fork vibrator type.

It is to be noted that the component force damping device as shown in FIGS. 1 and 2 may be used in any weighing machines other than the platform scale.

Various metal spring such as, for example, a torsion spring, a coil spring, a spiral spring, a leaf spring and the like or a rubber spring and the like may be used as the spring member for achieving the automatic recovery mechanism of the component force damping device.

Industrial Applicability:

Since the platform scale according to the present invention is capable of high precision weighing, it finds wide applications in various fields not only in production fields in manufacturing plants but also in distribution fields, medical fields, education and research fields, agricultural and fishing fields, homes and the like where weighing of heavy objects is required.

On the other hand, the component force damping device according to the present invention finds wide applications in various weighing machines such as platform scales, weighing conveyers and the like for weighing relatively heavy objects to be weighed.

DESCRIPTION OF REFERENCE NUMERALS 10 upper frame
20 base frame
30 load detection unit
31 upper support member
32 component force damping device
33 sensor case
35 cover
37 bolt
41 tuning fork vibrator
42 block body
43 bolt
51 diaphragm
52 mounting plate
53 clamping plate
61 first flat plate
62 second flat plate
63 linear movement bearing
64 needle bearings
65 mounting screws
66 spring member
67 mounting hole
68 holes
69 hole
71 rectangle holes
72 holes
301~306 load detection units
321~328 component force damping devices
351 hole
422 screw holes
701 projections
702 projections

What is claimed is:

1. A platform scale for weighing an object, comprising:
a support member for supporting the object,
a plurality of load detection units supporting the support member, and
at least four component force damping devices disposed between the support member and the load detection units, each of the component force damping devices comprising
an arrangement of a plurality of needle bearings disposed in parallel, and
a pair of opposed flat plates sandwiching the arrangement of the needle bearings and capable of making a relative movement in a direction of the arrangement of the needle bearings by the pair of flat plates, surfaces of each of the pair of opposed flat plates which are in contact with the plurality of needle bearings being flat;
wherein the at least four component force damping devices are in contact with the support member at four locations forming a rectangle,
wherein directions of the relative movement of any pair of component force damping devices at the same side of the rectangle differ to each other,
wherein directions of the relative movement of any pair of component force damping devices at the diagonal locations of the rectangle are identical to each other.

2. A platform scale of claim 1,
wherein a pair of the load detection units are disposed in parallel to support the support member, and
wherein each of the pair of load detection units is provided with a pair of the component force damping devices at locations on the same side of the rectangle.

3. A platform scale of claim 1,
wherein two pairs of the load detection units are arranged in two parallel rows and support the support member, and
wherein each of the two pairs of load detection units is provided with one of the component force damping devices in such a manner to form the rectangle.

4. The platform scale of claim 1,
wherein longitudinal axes of all of the plurality of needle bearings of a first one of any pair of component force damping devices at the same side of the rectangle and longitudinal axes of all of the plurality of needle bearings of a second one of the pair of component force damping devices at the same side of the rectangle are orthogonal to each other, and
wherein longitudinal axes of all of the plurality of needle bearings of a first one of any pair of component force damping devices at the diagonal locations of the rectangle and longitudinal axes of all of the plurality of needle bearings of a second one of the pair of component force damping devices at the diagonal locations of the rectangle are parallel to each other.

5. The platform scale of claim 1,
wherein the pair of flat plates comprise a first flat plate, and a second flat plate, and
wherein a spring member is connected to both of the first flat plate and the second flat plate.

6. The platform scale of claim 5,
wherein the spring member is a wire having a center coil section and two arms extending from the center coil section, wherein a free end of a first one of the two arms is bent towards the first flat plate, and
wherein a free end of a second one of the two arms is bent toward the second flat plate.

7. The platform scale of claim 1,
wherein a first one of the first and second flat plates comprises projections, and wherein a second one of the first and second flat plates comprises rectangular holes at positions corresponding to the projections, the rectangular holes being extended in a direction orthogonal to the longitudinal axes of the plurality of needle bearings.

* * * * *